May 1, 1928.
D. N. THOMPSON
1,667,961
FIXTURE OUTLET BOX ADAPTER
Filed April 2, 1925
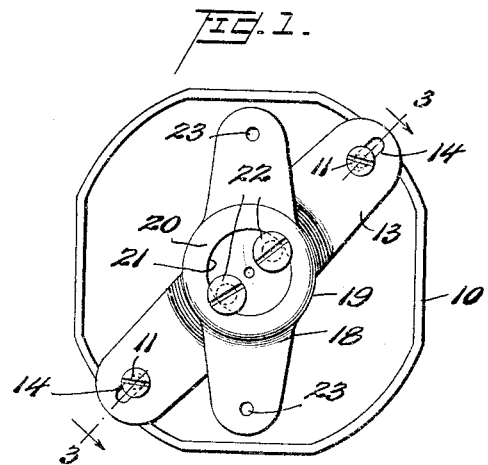
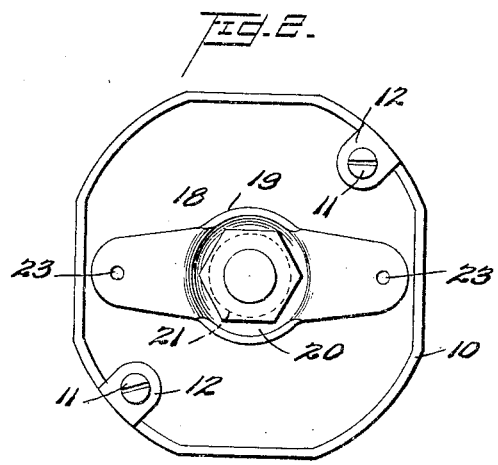
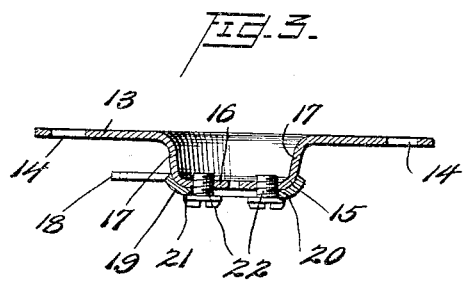
Inventor
Don N. Thompson,
By Watson, Coit, Morse & Grindle,
Attorney Patented May 1, 1928.

1,667,961

UNITED STATES PATENT OFFICE.

DON N. THOMPSON, OF SYRACUSE, NEW YORK, ASSIGNOR TO PASS & SEYMOUR, INCORPORATED, OF SYRACUSE, NEW YORK, A CORPORATION OF NEW YORK.

FIXTURE OUTLET-BOX ADAPTER.

Application filed April 2, 1925. Serial No. 20,209.

This invention relates to electric wiring equipment and more particularly to adjustable, fixture outlet-box adapters.

It is the general object of the present invention to provide a novel and improved form of fixture outlet-box adapter.

More particularly it is an object of the present invention to provide a fixture outlet-box adapter which will permit the proper positioning of a fixture irrespective of the type or angular position of the fixture-box.

A further object of the present invention consists in the provision of a fixture outlet-box adapter which may be secured to the fixture outlet-box by means of the cover screw thereof so as to provide angular adjustment for properly positioning the fixture but which may also be fastened to a fixture stud within the box to provide the same angular adjustment for the fixture.

In the mounting of electric fixtures and more particularly wall fixtures, it is usually desirable to be able to adjust the angularity of the fixture as desired, since certain fixtures have non-circular canopies or bases and otherwise require to be positioned exactly regarding their angular relation to the vertical or horizontal. It is often found that the fixture outlet-box is not properly positioned to allow such mounting where there is no adjustable adapter provided. It is usual to fasten the fixture to an adapter which is secured by the cover screws to the fixture outlet-box and since these boxes come in various shapes and sizes there is a possibility that sometimes the screws may be in vertical alignment, other times in horizontal alignment or they may assume any of the various angular positions therebetween, which makes it necessary for the workman to have a number of different adapters in order to obtain the proper mounting of the fixture and oftentimes the exact proper angle is not obtained. The present invention makes it possible to overcome these difficulties in a simple manner.

In the accompanying drawings and the following specification there is disclosed a single embodiment of the present invention with the understanding however that various changes and modifications may be made therein by those skilled in the art in the size, shape, material, proportion and arrangement of the various parts without departing from the spirit of the invention or the scope of the appended claims.

In the said drawings:

Fig. 1 is an elevation of a fixture outlet-box adapter as mounted in position on an octagonal outlet-box by means of the cover screws;

Fig. 2 is a similar view showing the method of mounting the device upon a fixture stud; and Fig. 3 is a section through the adapter on line 3—3 of Figure 1, the box being omitted.

Referring to the drawing there is disclosed at 10 a conventional form of outlet-box here disclosed as octagonal in shape although it may be understood that various other forms such as rectangular, square, circular, etc., may be used with equal facility provided the distance between the cover screws 11 thereof is suitable. The boxes come in various sizes designated as 3 inch, 4 inch, etc., and for each particular size an adapter will be made. The present disclosed boxes are of the 3 inch size and it will be understood that the adapter shown is suitable for any shape of 3 inch box. The cover screws 11 pass into inturned lugs 12 which are substantially flush with the face of the box. The adapter is provided with a lower strop 13 adapted to rest upon the lugs 12 and be secured thereto by the screws 11 passing through the elongated openings 14 in the strap, as shown in Figure 1. As shown in Figure 3, the center portion of this strap 13 is widened and punched upward into a cup formation such as 15 having a flattened top 16 and rounded tapered sides 17. The adjustable member 18 is adapted to be secured to the strap 13 and for this purpose is provided with the widened center portion 19 having a shallow cupped portion 20 of a suitable configuration to receive the cupped portion of the strap 13, as best shown in Figure 3.

The center of the cupped portion 20 is removed by stamping, providing the circular wall 21 and the two parts of the adapter are secured together by the screws 22 which are threaded into the flattened top 16 of the cupped portion on the strap 13 and are so spaced apart as to just make contact with the inner circular wall 21 on the adjustable part 18 and the enlarged flattened heads of these screws serve to prevent the withdrawal or separation of the two parts. When the screws 22 are loose, the part 18 may be rotated to change its angular relation in respect to the part 13, the two cups bearing upon each other to form a pivot and when the proper adjustment is obtained, the tightening of the screws 22 securely holds the parts together and in their adjusted position assisted by the clamping action between the two cups. The fixture is secured to the extended arms of the part 18 by having screws pass through it and into the threaded openings 23 in these extended arms and it will be seen from Figure 1 that no matter what the angular position of the strap 13 that the proper angular position of the strap 18 can readily be obtained to so arrange the fixture as to have its parts in their proper position.

If it is desired, for any reason, to mount the fixture upon a fixture stud, which as is well known is a threaded, projecting rod suitably fastened in the bottom of the box, the strap 13 is removed by removing one or both of the screws 22 and the part 18 can then be slipped over the stud since the hole in the center of it is large enough for this purpose. Lock nuts are arranged on the stud, one on either side of the part 18 and one of them fits with the cup-like portion 20 and serves to exactly center the adjustable part 18 in spite of the fact that the hole in its center may be larger than the stud. These lock nuts also serve to adjust the relative distance between the part 18 and the front face of the box and of course angular adjustment is properly obtained before the lock nuts are tightened in position.

It will thus be seen that the present invention provides a novel, adjustable form of fixture outlet-box adapter which will allow the mounting, at its proper angle, of a wall fixture upon any conventional type of outlet-box arranged at any angle and will also allow the fixture to be secured either by the cover screws of the outlet-box or to a fixture stud, and without the use of any extra parts.

Having thus described the invention what is claimed as new and desired to be secured by Letters Patent is:

1. In a fixture adapter for outlet-boxes, in combination with an outlet-box having cover screws, a strap adapted to extend across the face of said box and provided with slots to receive said screws, a cup-shaped portion on said strap, a second strap, a corresponding cup-shaped portion thereon adapted to fit over said first cup-shaped portion, means securing said cups together for pivotal adjustment between said straps, and means for attaching a fixture to said second strap.

2. In a fixture adapter for outlet-boxes, in combination with an outlet-box having cover screws, a strap adapted to extend across the face of said box and provided with slots to receive said screws, a cup-shaped portion on said strap, a second strap, a corresponding cup-shaped portion thereon adapted to fit over said first cup-shaped portion, said second cup-shaped portion being provided with a circular central opening, screws passing through said opening and into said first cup-shaped portion to pivotally secure said parts together.

3. In a fixture adapter for outlet boxes, in combination, a strap substantially equivalent in length to the diameter of a box, said strap having screw receiving openings in the ends thereof, a cupped center portion on said strap, a second strap shorter than said first strap and having a cupped center portion adapted to telescope over the cupped center of said first strap, the bottom of said second cup being removed to provide an opening adapted to fit over a fixture stud, removable means to adjustably secure said cups together and means whereby a fixture may be attached to said second strap.

In testimony whereof I hereunto affix my signature.

DON N. THOMPSON.